US012801300B2

(12) United States Patent
Gaonkar et al.

(10) Patent No.: US 12,801,300 B2
(45) Date of Patent: Nov. 17, 2026

(54) PROVIDING INFORMATION TO AN OPERATING SYSTEM FOR MANAGING LOGICAL PARTITIONS OF MEMORY OF SERVERS

(71) Applicant: International Business Machines Corporation, Armonk, NY (US)

(72) Inventors: Chetan L. Gaonkar, Kumta (IN); Vamshikrishna Thatikonda, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/824,732

(22) Filed: Sep. 4, 2024

(65) Prior Publication Data

US 2026/0064300 A1 Mar. 5, 2026

(51) Int. Cl.
*G06F 3/06* (2006.01)

(52) U.S. Cl.
CPC .......... *G06F 3/0644* (2013.01); *G06F 3/0604* (2013.01); *G06F 3/0679* (2013.01)

(58) Field of Classification Search
CPC ..... G06F 3/0644; G06F 3/0604; G06F 3/0679
See application file for complete search history.

(56) References Cited

U.S. PATENT DOCUMENTS 8,312,201 B2 11/2012 Fleming
2011/0107054 A1* 5/2011 Hepkin .................. G06F 13/16 711/E12.001
2015/0378612 A1* 12/2015 Bhat .................. G06F 9/45558 711/154
2017/0010979 A1 1/2017 Kumar et al.
2019/0294333 A1* 9/2019 Zaidman .............. G06F 3/0604
2020/0104187 A1 4/2020 Morrell

OTHER PUBLICATIONS

Anonymous, "System and Associated Methods to Implement Dynamic Memory Management in a Cloud Environment Where Systems Are Interconnected Through a High-Speed Cache-Coherent Bus," IP.com Prior Art Database Technical Disclosure No. IPCOM000273738D, Feb. 10, 2024, 5 pages.

(Continued)

*Primary Examiner* — Francisco A Grullon
(74) *Attorney, Agent, or Firm* — Harrity & Harrity, LLP

(57) ABSTRACT

A method, according to one embodiment, includes obtaining information generated by a hypervisor, where the generated information details a classification process. The classification process includes classifying physical memory blocks as residing on a first server or a second server, and associating the physical memory blocks with logical memory blocks of logical partitions of the first server and logical partitions of the second server. The method further includes providing the generated information to an operating system used to manage the logical partitions of the first server and the logical partitions of the second server. The operating system is caused to use the information to classify memory pools to a home memory cluster of the first server or to a remote memory cluster of the second server, and memory pages are caused to be dynamically stored within allocations of the memory pools based on predetermined usage statistics.

20 Claims, 7 Drawing Sheets

(56) References Cited

OTHER PUBLICATIONS

Ge et al., "Memory sharing for handling memory overload on physical machines in cloud data centers," Journal of Cloud Computing: Advances, Systems and Applications, 2023, pp. 1-20.
Anonymous, "Virtual Memory Mangement initiated AME thread placement for speedy memory expansion," IP.com Prior Art Database, Technical Disclosure No. IPCOM000255657D, Oct. 8, 2018, 6 pages.
IBM, "IBM Systems, Q&A: Stephen Leonard on the Business Value of IBM Power10," IBM Newsroom, 2024, 6 pages, retrieved from https://newsroom.ibm.com/IBM-systems?item=32297.
Sheldon, R., "logical partition (LPAR)," TechTarget, Aug. 2023, 4 pages, retrieved from https://www.techtarget.com/whatis/definition/logical-partition-LPAR#:~:text=A%20computer%20can%20host%20multiple,just%20like%20its%20physical%20counterpart.

* cited by examiner

PROVIDING INFORMATION TO AN OPERATING SYSTEM FOR MANAGING LOGICAL PARTITIONS OF MEMORY OF SERVERS

BACKGROUND

The present invention relates to memory, and more specifically, this invention relates to logical partitions of memory of a server.

Server hardware technologies enable different servers to loan memory among one another through special connected high-speed memory links. This way, some data may be allocated to local memory of a first server, while other data may be allocated from the first server to non-local memory of a second server.

SUMMARY

A method, according to one embodiment, includes obtaining information generated by a hypervisor, where the generated information details a classification process. The classification process includes classifying physical memory blocks as residing on a first server or a second server, and associating the physical memory blocks with logical memory blocks of logical partitions of the first server and logical partitions of the second server. The method further includes providing the generated information to an operating system used to manage the logical partitions of the first server and the logical partitions of the second server. The operating system is caused to use the information to classify memory pools to a home memory cluster of the first server or to a remote memory cluster of the second server, and memory pages are caused to be dynamically stored within allocations of the memory pools based on predetermined usage statistics.

A computer program product, according to another embodiment, includes one or more computer-readable storage media, and program instructions stored on the one or more storage media to perform the foregoing method.

A computer system, according to another embodiment, includes a processor set, one or more computer-readable storage media, and program instructions stored on the one or more storage media to cause the processor set to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
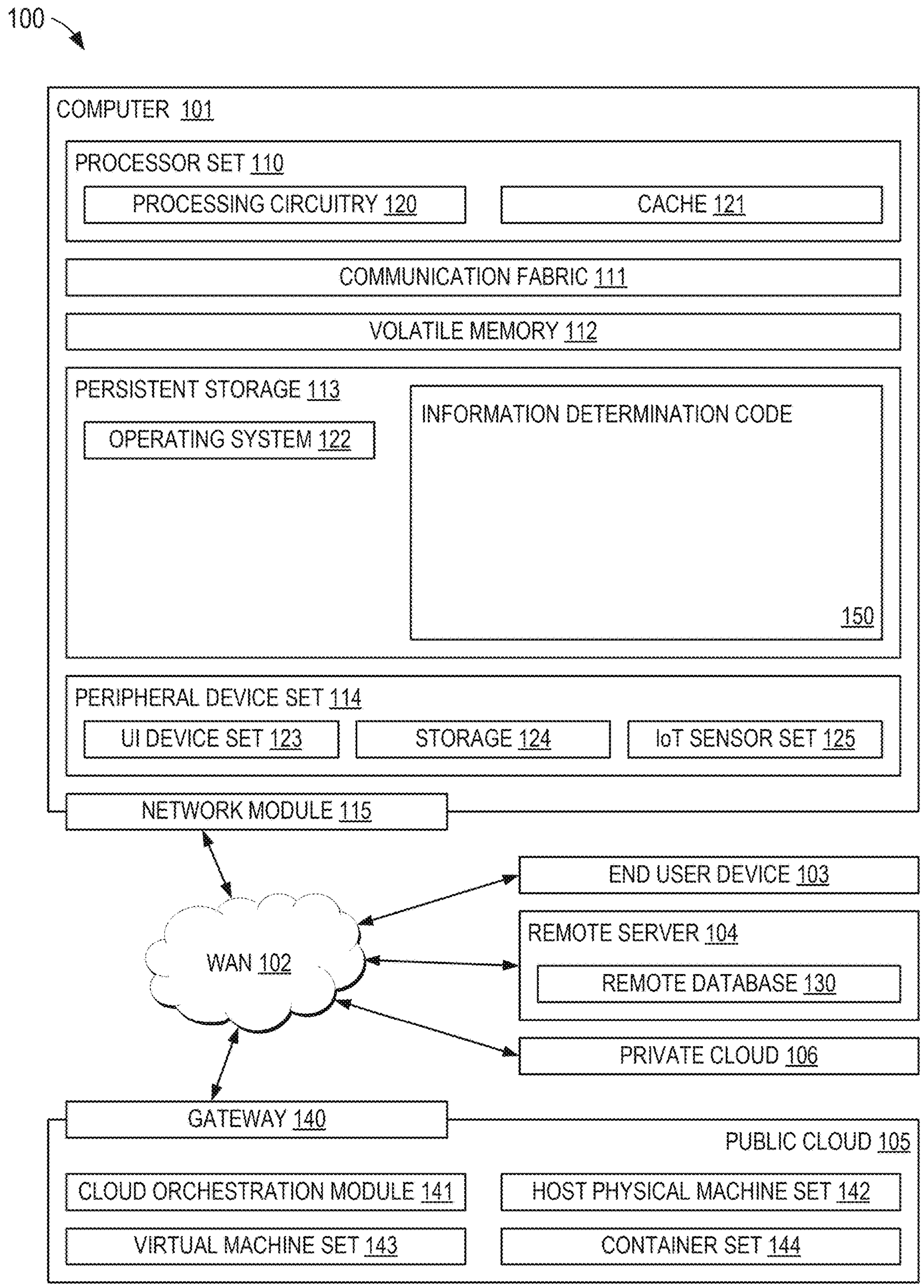
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing information from a hypervisor to an operating system for managing logical partitions of memory of servers.

In one general embodiment, a method includes obtaining information generated by a hypervisor, where the generated information details a classification process. The classification process includes classifying physical memory blocks as residing on a first server or a second server, and associating the physical memory blocks with logical memory blocks of logical partitions of the first server and logical partitions of the second server. The method further includes providing the generated information to an operating system used to manage the logical partitions of the first server and the logical partitions of the second server. The operating system is caused to use the information to classify memory pools to a home memory cluster of the first server or to a remote memory cluster of the second server, and memory pages are caused to be dynamically stored within allocations of the memory pools based on predetermined usage statistics.

In another general embodiment, a computer program product includes one or more computer-readable storage media, and program instructions stored on the one or more storage media to perform the foregoing method.

In another general embodiment, a computer system includes a processor set, one or more computer-readable storage media, and program instructions stored on the one or more storage media to cause the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as information determination code of block 150 for providing information to an operating system for managing logical partitions of memory of servers. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
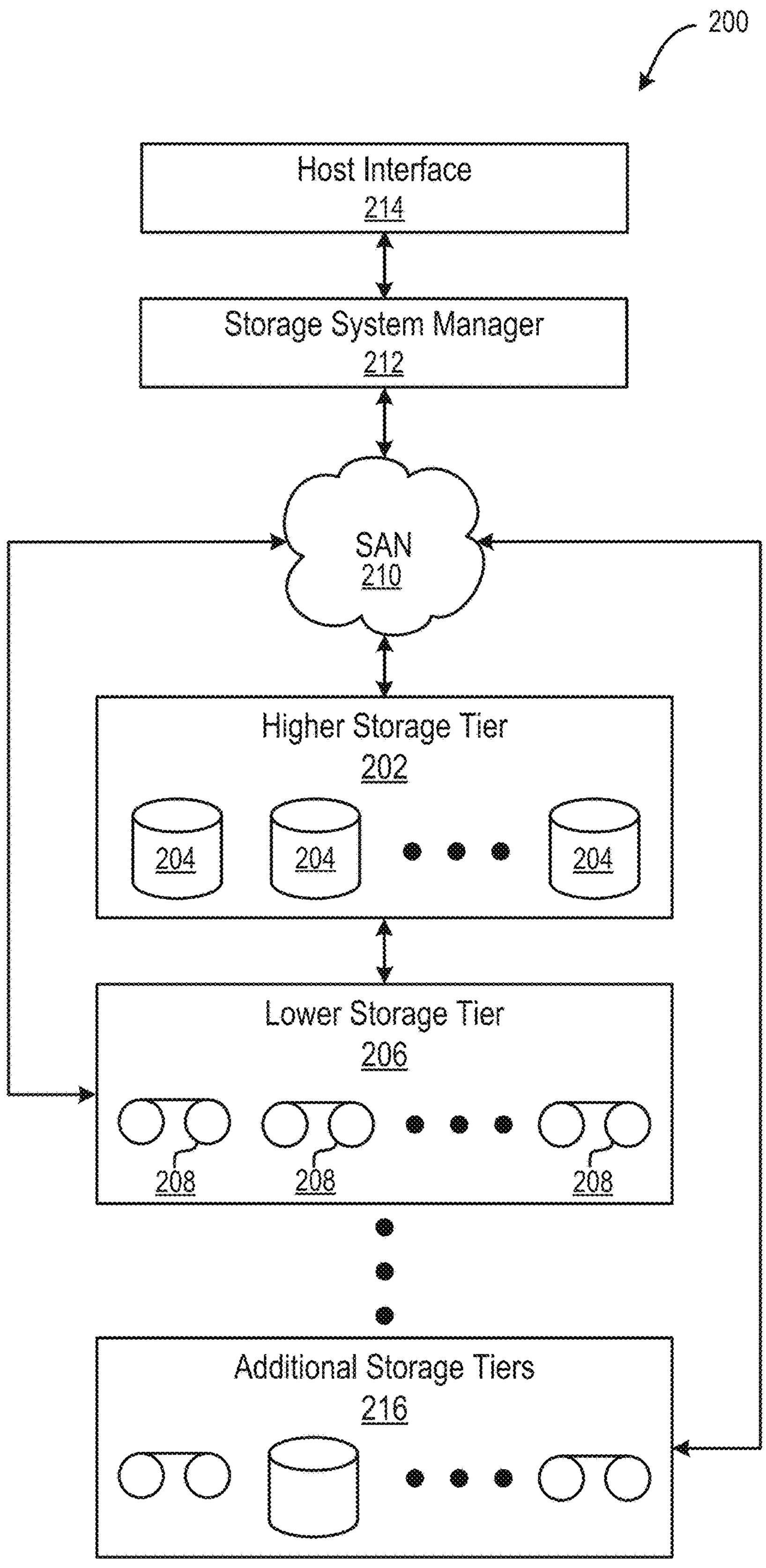
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, server hardware technologies enable different servers to loan memory among one another through special connected high-speed memory links. This way, some data may be allocated to local memory of a first server, while other data may be allocated from the first server to non-local memory of a second server.

In some server hardware infrastructures, a first system can obtain, e.g., loan, portions of memory from a second system and can allocate the memory to one or more logical partitions (LPAR) present in the first system. For descriptions herein, an LPAR of memory of a server may be defined as a subset of the server's memory and/or I/O resources that itself is able to operate like a physical server. A computer can host multiple LPARs, each one running independently of the other. Access to this loaned memory is, in some approaches, facilitated through a high speed memory link connector across the systems.

Typically, in power environments, LPARs of memory that are carved with logical memory resources are transparent to their real memory layout on the system. For example, in some deployments, an LPAR created on a first server, e.g., "server A", may obtain a portion of logical memory from a real memory chunk that is borrowed from a second server that is a different server than the first server, e.g., "server B". In some use cases in which a thread that belongs to the LPAR runs on a processor core and attempts to access the borrowed memory, a result of the attempted access includes the system bringing in the required data to the cache lines with the help of the new interconnect. However, an operating system that runs in such an LPAR environment does not know the underlying real memory pools on the system. As a result, accessing the borrowed memory of a memory pool may result in varying experienced latencies with respect to memory of a memory pool that is not borrowed.

In sharp contrast to the deficiencies described above, the techniques of various embodiments and approaches described herein mitigate latency experienced during the use of logical memory resources by reducing references made to borrowed memory. This reduction of latency is enabled as otherwise referring to borrowed memory addresses would otherwise incur delay in comparison to a reference made to non-borrowed memory addresses.

Figure 3A:
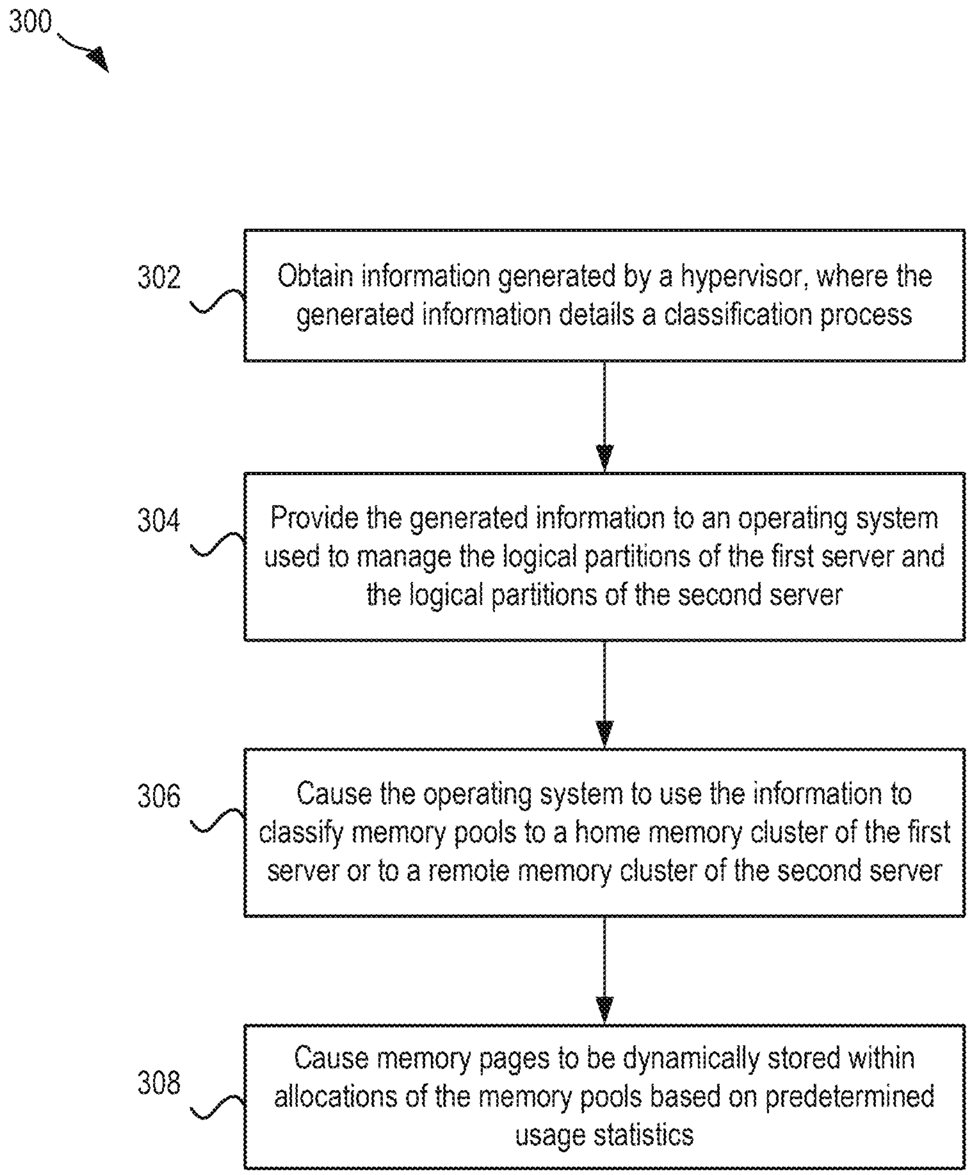
FIG. 3A is a flowchart of a method, in accordance with one embodiment of the present invention.

Now referring to FIG. 3A, a flowchart of a method 300 is shown according to one embodiment. The method 300 may be performed in accordance with aspects of the present invention in any of the environments depicted in FIGS. 1-3E, among others, in various embodiments. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that the techniques of embodiments and approaches described herein may, in some approaches, be implemented in server based architectures in which memory allocations span over more than one server, e.g., thereby potentially establishing virtual memory that extends over a plurality of servers. In some approaches, these servers are instructed to operate together in order to share memory with one another. In one or more of these approaches, these servers may incorporate Memory Inception technologies by INTERNATIONAL BUSINESS MACHINES (IBM), which is a capability designed to allow clients to create memory pools across multiple systems for enabling the scaling to multiple petabytes of memory.

Operation 302 includes obtaining information generated by a hypervisor. The hypervisor is preferably configured to generate information detailing a classification process. In some preferred approaches, the classification process includes operations that enable memory classification on a memory borrowing, e.g., memory "inception", enabled system. For context, such a system, in some preferred approaches, includes at least a first server, e.g., a local home server, and a second server, e.g., a remote server. In some approaches, the servers, e.g., the servers of the system that borrow memory from one another may be connected by a type of link that would become apparent to one of ordinary skill in the art after reading the descriptions herein, e.g., high speed I/O interconnects.

In some approaches, the classification process includes classifying real physical memory blocks as residing on a first server or a second server of the system described above. Furthermore, in some approaches, the classification process may include associating the physical memory blocks with logical memory blocks of logical partitions of the first server and different logical partitions of the second server. In some illustrative approaches, with respect to the classification process, the hypervisor may include a novel mechanism to classify physical memory blocks (PMBs) into memory borrowed PMBs and non-borrowed memory PMBs, as well as to provide information detailing these classifications to an operating system while associating logical memory blocks (LMBs) with PMBs.

In some use cases, at least a portion of the classification process is performed during instances in which LPAR is carved out on central processor complexes, e.g., such as central electronics complex (CEC) by IBM. For example, the hypervisor may be caused, e.g., instructed, to provide additional information for the logical memory of the LPAR.

This additional information, for example, may include real memory layout on the system.

With continued reference to FIG. 3A, operation 304 includes providing the generated information to an operating system used to manage the logical partitions of the first server and the different logical partitions of the second server. In some approaches, the generated information is obtained from the hypervisor and then output to the operating system. In some other approaches, an instruction is issued to the hypervisor to provide the information to the operating system. In other words, in some approaches, the hypervisor is caused to tell the operating system about the real locality of the all the memory pools assigned for an LPAR. Operation 306 includes causing the operating system to use the information to classify memory pools to a home memory cluster of the first server or to a remote memory cluster of the second server. More specifically, in some approaches, at least some logical memory pools created for the LPAR are classified into "home" (non-borrowed memory with respect to the first server) memory cluster(s) and "remote" memory cluster(s) (borrowed memory with respect to the first server) based on the locality information received from the hypervisor. This way, a first portion of the memory pools are created for the logical partitions of the first server and a second portion of the memory pools are created for the logical partitions of the second server.

For context, in some preferred approaches, a remote memory cluster described herein may refer to the memory pools that are carved out to this LPAR from the remote system.

In order to enable memory expansion within the LPAR that includes the first server and the second server's memory resources, in some approaches, the operating system may be caused, e.g., instructed, to prioritize the compressed pool memory allocation to a remote memory cluster of the second server, while ensuring that uncompressed pools are allocated in a home memory cluster of the first server. Furthermore, as will now be described below, the operating system may be caused to always consider remote memory clusters as being relatively low priority with respect to new allocations. In some approaches, in order to reduce latency while retrieving data stored on the first server, the above allocation schemes may be followed to cause the operating system to use the information to classify the memory pools to the home memory cluster of the first server or to the remote memory cluster of the second server may include classifying a first portion of the memory pools to the home memory cluster of the first server, where the first portion of the memory pools do not include compressed memory pools. Instead, any compressed memory pools are preferably classified to the second server. For example, in some approaches, method 300 includes classifying a second portion of the memory pools to the remote memory cluster of the second server, where the second portion of the memory pools include at least some compressed memory pools.

Figure 3B:
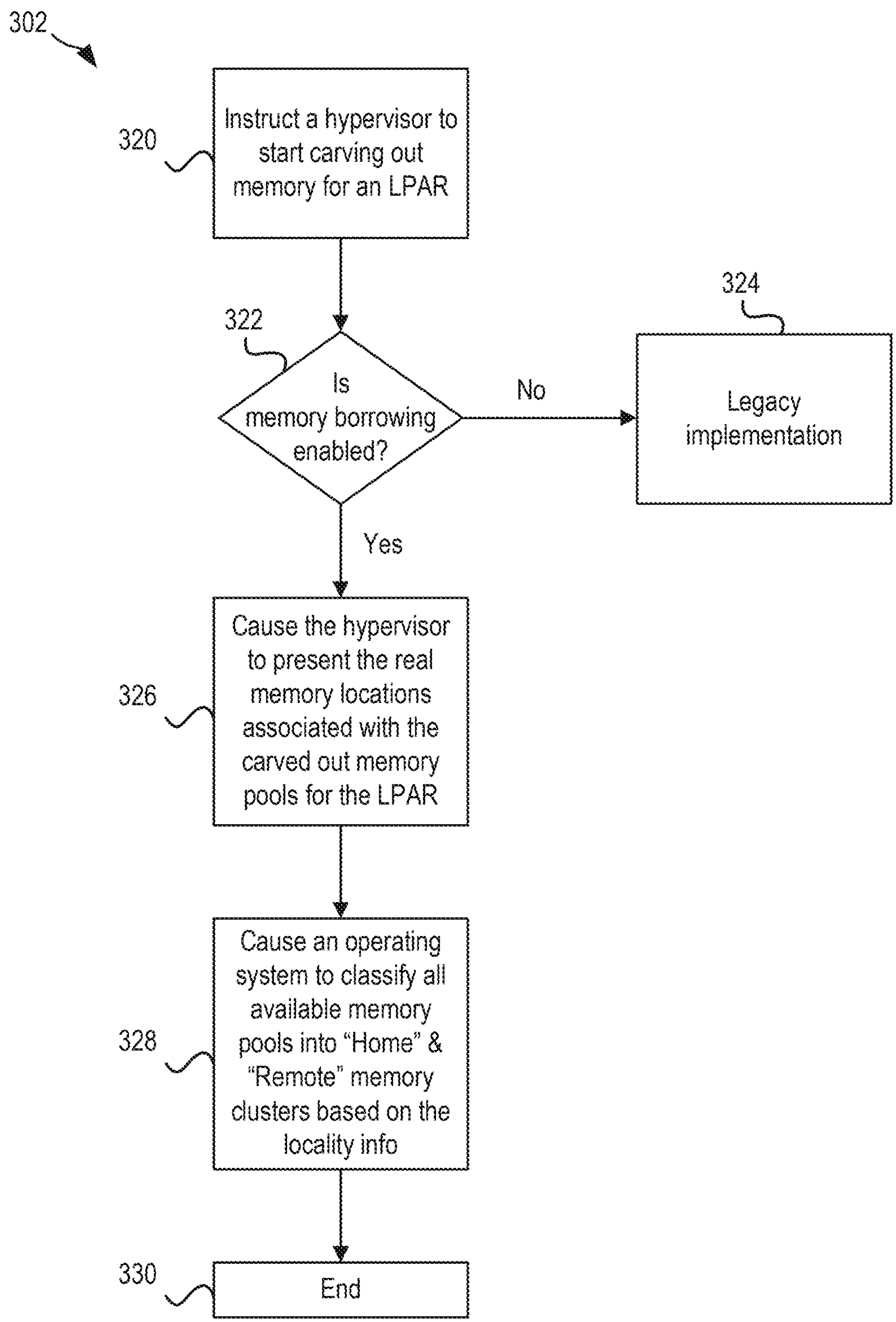
FIG. 3B is a flowchart of sub-operations of the method of FIG. 3A, in accordance with one embodiment of the present invention.

Looking to FIG. 3B, exemplary sub-operations of providing the generated information to an operating system and causing the operating system to use the information to classify memory pools to a home memory cluster of the first server or to a remote memory cluster of the second server are illustrated in accordance with one embodiment, one or more of which may be used to perform operations 304 and 306 of FIG. 3A. However, it should be noted that the sub-operations of FIG. 3B are illustrated in accordance with one embodiment which is in no way intended to limit the invention.

Sub-operation 320 includes instructing a hypervisor to start carving out memory for an LPAR. A determination may be made as to whether memory borrowing, e.g., memory inception features within a system, are enabled, e.g., see sub-operation 322. For context, memory borrowing features described herein may selectively be enabled by deploying sub-operation 322. In response to a determination that memory borrowing is not enabled, a legacy implementation may optionally be enabled instead of performing other memory borrowing operations described herein, e.g., see sub-operation 324. In contrast, in response to a determination that memory borrowing is enabled, the hypervisor may be caused, e.g., instructed, to present the real memory locations associated with the carved out memory pools for the LPAR to the operating system, e.g., see sub-operation 326.

Sub-operation 328 includes causing an operating system to classify all available memory pools into "home" & "remote" memory clusters based on the locality information provided by the hypervisor. The sub-process optionally ends thereafter, e.g., sub-operation 330, and/or other operations of method 300 may additionally and/or alternatively be performed.

With reference again to FIG. 3A, operation 308 includes causing memory pages to be dynamically stored (e.g., by instructions issued to the operating system) within allocations of the memory pools based on predetermined usage statistics. For context, for descriptions herein, a memory page may be defined as data that may contain actual data and/or metadata related to a workload and/or kernel. For further context, this dynamic storage, in some preferred approaches, ensures that memory pages that are relatively more frequently used are available for accessing without latency as a result of being stored on uncompressed pools that are allocated in a home memory cluster of the first server. Meanwhile, this dynamic storage, in some preferred approaches, additionally and/or alternatively ensures that memory pages that are relatively less frequently used are stored on pools that are allocated in a remote memory cluster of the second server, which may include compressed pools allocated in a remote memory cluster of the second server.

In some approaches, a first of the predetermined usage statistics that the dynamic storage of memory pages is based on includes an age of the memory pages. In some approaches, the age is defined within a predetermined usage period (such as since the boot of one or more of the servers), while in some other approaches, the age is based on an entire existence of a memory page. The causing the operating system to dynamically store the memory pages within the allocations of the memory pools based on the first predetermined usage statistic, in some approaches, includes causing new memory pages to be stored to a memory pool classified to a home memory cluster of the first server and not to be stored to a remote memory cluster of the second server.

In some other approaches, factors that dynamic storage of memory pages additionally and/or alternatively may be based on includes the type of memory page. For example, in some approaches, all kernel memory pages (klock) allocation is preferably allocated only in home memory cluster(s) of the first server. These memory pages may, depending on the approach, include a software page table, an external page table, etc. Accordingly, in one or more approaches, all pinned memory pages and kernel memory pages are only stored within allocations of the memory pools classified to the home memory cluster of the first server. In some approaches, there may be exceptions to this storage policy, e.g., such as during periods in which a predetermined flag (that is based on a threshold and/or a reaffinitization process)

is set. However, as will be described below, subsequent to allocations being performed, in some approaches, a reaffinitization process may be performed in order to ensure that prioritized memory pages are stored to memory pools of the first server.

Figure 3C:
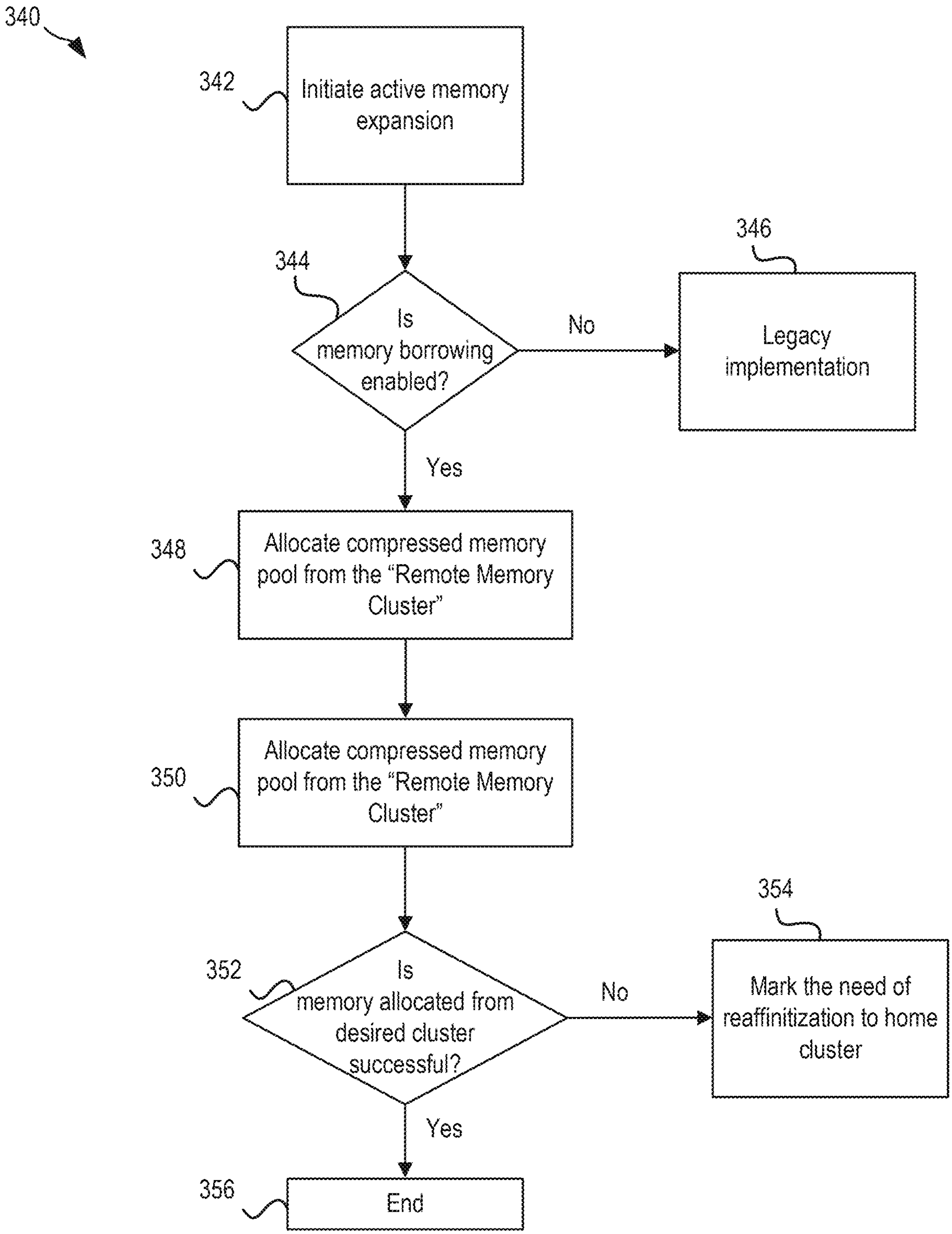
FIG. 3C is a flowchart of a method, in accordance with one embodiment of the present invention.

Looking to FIG. 3C, exemplary sub-operations of allocating memory pools and performing a reaffinitization process are illustrated in accordance with one embodiment. It should be noted that the sub-operations of FIG. 3B are illustrated in accordance with one embodiment which is in no way intended to limit the invention.

For context, the flowchart 340 of FIG. 3C illustrates techniques for pool creation for active memory expansion, e.g., see initiation of an active memory expansion in the system in sub-operation 342, within the infrastructure of the system that includes the first server and the second server. Active memory expansion, in some approaches, creates the compressed memory pool and uncompressed memory pool described herein. In some approaches, similar to sub-operations of FIG. 3B, a determination may be made as to whether memory borrowing is enabled, e.g., see sub-operations 344. In response to a determination that memory borrowing is not enabled, a legacy implementation may optionally be initiated, e.g., see operation 346, while in response to a determination that memory borrowing is enabled, allocations may be performed, e.g., see sub-operations 348-350. More specifically, in some approaches, these allocations compress low profile pages (not required for processes) and keeps all of the compressed low profile (page or pages) in a compressed pool of the second server. In situations in which the processes attempt to access the compressed page, then compressed page/pages are uncompressed from the compressed pool. Techniques described herein obtain the pages from the memory pools marked as "home memory cluster" while creating the uncompressed memory pool. Similarly, these techniques propose to obtain the pages from the memory pool which is marked as a "remote memory cluster" memory pool, while creating the compressed memory pool.

A determination may be made as to whether the attempted allocations are successful, e.g., see sub-operation 352. In some approaches in which the first server does not have any available memory pools, a predetermined flag (a reaffinitization flag) may be set, e.g., see sub-operation 354, and memory pages that otherwise would have been stored to memory pools of the first server are stored on the second server. In contrast, in response to determination that the allocation(s) are successful, the flowchart optionally ends, e.g., see sub-operation 356.

Figure 3D:
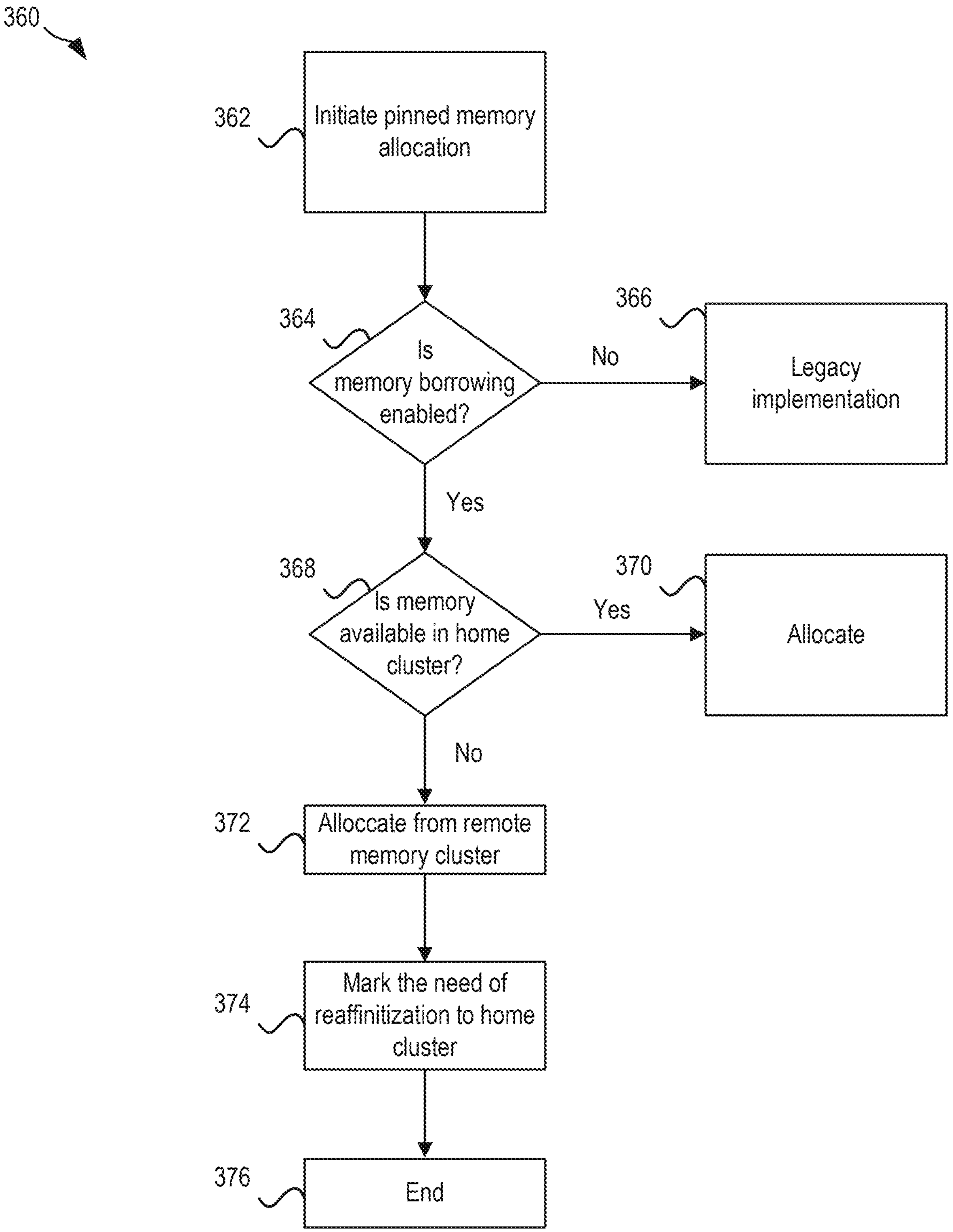
FIG. 3D is a flowchart of a method, in accordance with one embodiment of the present invention.

Looking to FIG. 3D, exemplary sub-operations of pinned memory page allocation are illustrated in accordance with one embodiment of flowchart 360, one or more of which may be used to perform operation 308 of FIG. 3A. However, it should be noted that the sub-operations of FIG. 3D are illustrated in accordance with one embodiment which is in no way intended to limit the invention.

For context, the sub-operations of flowchart 360 detail pinned memory pages being stored within a system that includes the first server and the second server of method 300. Accordingly, flowchart may include sub-operation 362 which includes initiating a pinned memory page allocation task. In some approaches, a determination may be made as to whether memory borrowing is enabled, e.g., see sub-operations 364. In response to a determination that memory borrowing is not enabled, a legacy implementation may optionally be initiated, e.g., see operation 366, while in response to a determination that memory borrowing is enabled, a determination may be made as to whether memory is available in the home cluster of the second server, e.g., see sub-operation 368. Note that this determination is made with respect to the home cluster because pinned memory pages are preferably always stored and/or accessed on the first server, e.g., see sub-operation 370 which is performed provided that such memory is available for the pinned memory page. For example, in response to a determination that requested memory for this pinned allocation does not exist in the "home memory cluster", in some approaches, the pinned memory may be accessed from the associated pages from the memory pool of the "remote memory cluster".

In some other approaches, in response to a determination that such memory is not available, a remote memory cluster may be allocated to temporarily store the pinned memory page until memory on the first server becomes available, e.g., see sub-operation 372. In order to track that the pinned memory should be moved to the first server once such memory becomes available, a predetermined reaffinitization flag may be set, e.g., see sub-operation 374, and the flowchart optionally ends, e.g., see sub-operation 376. In other words, in some cases in which the pages are being received in an unintended manner, those allocations may be marked with a flag indicating a "need of reaffinitization to the home cluster." or a "need of reaffinitization to the remote cluster."

With reference again to FIG. 3A, in some approaches, a dynamic threshold value may be applied to the storage of memory pages to allocations of the memory pools classified to the home memory cluster to ensure that memory of the home memory clusters is not exhausted. Accordingly, method 300, in some approaches, includes applying a first threshold value to the dynamic storage of the memory pages within the allocations of memory pools. The first threshold value may, in some approaches, be based on a number of (a number of available memory blocks of the memory pools classified to the home memory cluster) the allocations of the memory pools classified to the home memory cluster to prevent an overallocation of memory blocks of the memory pools classified to the home memory cluster. In order to apply the first threshold value, the causing the memory pages to be dynamically stored within the allocations of the memory pools based on predetermined usage statistics may include setting a predetermined flag (also referred to herein as a "reaffinitization flag") and not causing memory pages to be dynamically stored within the allocations of the memory pools classified to the home memory cluster in response to a determination that the first threshold value is met and/or exceeded. Instead, in some approaches, in response to such a determination, method 300 optionally includes causing the memory pages to be dynamically stored within the allocations of the memory pools classified to the remote memory cluster. In contrast, in some approaches, in response to a determination that the first threshold value is not met and/or exceeded, method 300 includes causing the memory pages to be dynamically stored within the allocations of the memory pools classified to the home memory cluster.

Figure 3E:
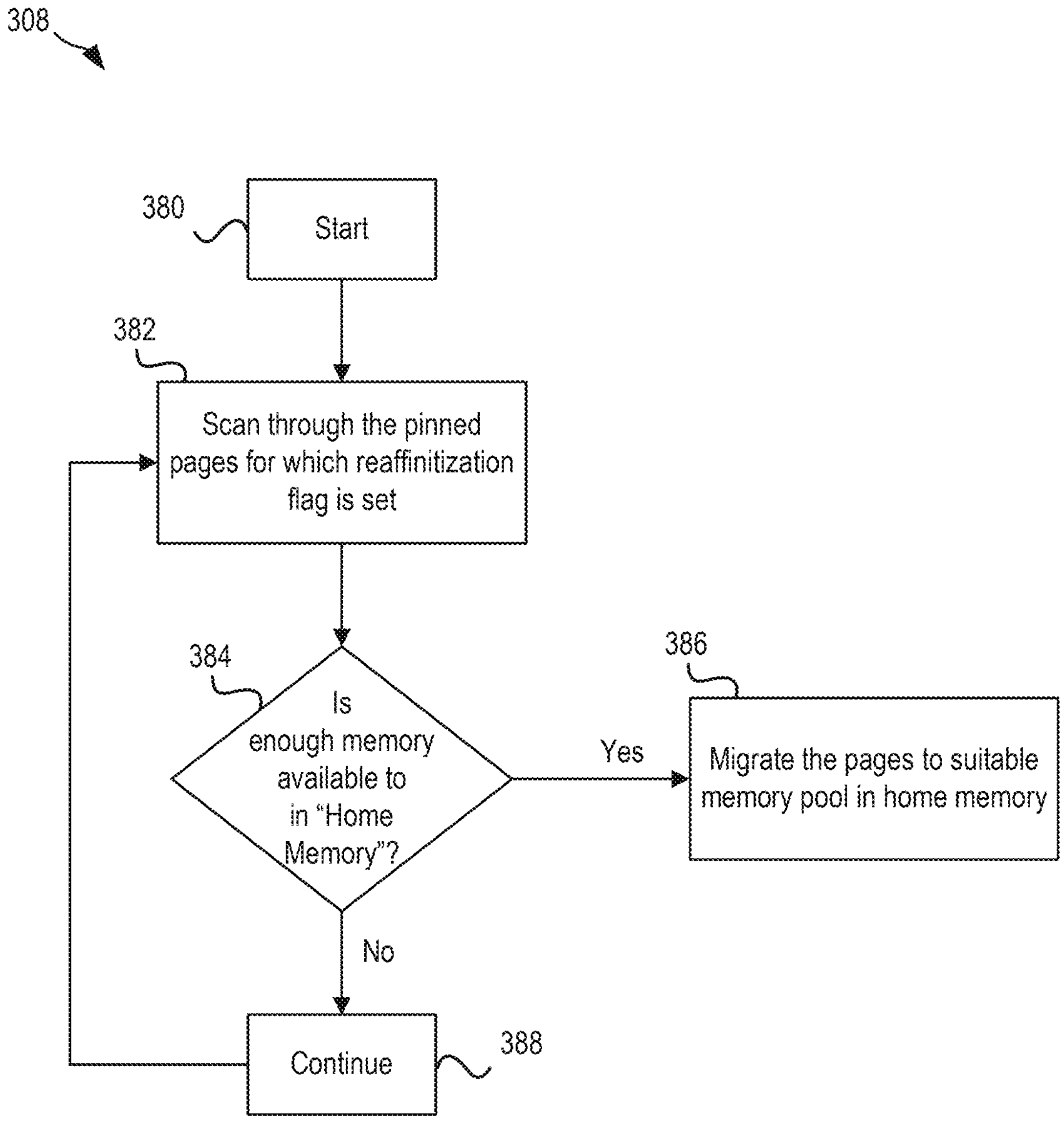
FIG. 3E is a flowchart of a method, in accordance with one embodiment of the present invention.

Referring now to FIG. 3E, sub-operations of using the reaffinitization flag in the process of causing the operating system to dynamically store memory pages within allocations of the memory pools based on predetermined usage statistics is described. More specifically, looking to FIG. 3E, exemplary sub-operations of causing memory pages to be dynamically stored within allocations of the memory pools based on predetermined usage statistics are illustrated in accordance with one embodiment, one or more of which may be used to perform operation 308 of FIG. 3A. However, it should be noted that the sub-operations of FIG. 3E are illustrated in accordance with one embodiment which is in no way intended to limit the invention.

For context, the sub-operations of FIG. 3E illustrate a reaffinitization of pinned memory pages from a remote memory cluster to a home memory cluster. As will be described in further detail below, these sub-operations include scanning pages which are marked for reaffinitization to the home cluster. In response to a determination that enough memory is available in the home cluster (above a second predetermined threshold based on the available memory of the first server), the pages may be migrated to a suitable memory pool of the home cluster. Similarly, pages that are marked for reaffinitization to a remote cluster may be migrated to the remote cluster based on the availability threshold.

In sub-operation 380, a determination to initiate a reaffinitization process may be initiated in response to a determination that the first threshold value is no longer exceeded and/or in response to a determination that the predetermined flag is unset in response to the first threshold value no longer being exceeded. In response to the predetermined flag being unset, the predetermined reaffinitization process is preferably performed. In some preferred approaches, the predetermined reaffinitization process includes scanning for memory pages stored, as a result of the predetermined flag being set, e.g., see sub-operation 382. These memory pages may include memory pages within the allocations of the memory pools classified to the remote memory clusters of the second server. In response to a determination, e.g., see sub-operation 384, that sufficient memory is available on the first server to accommodate the memory pages identified by the scanning, the memory pages identified by the scanning are caused to be stored within the allocations of the memory pools classified to the home memory clusters of the first server, e.g., see sub-operation 386. In contrast, in response to a determination that sufficient memory is not available on the first server to accommodate the memory pages identified by the scanning, scanning may continue, e.g., see sub-operation 388, and/or the predetermined flag may be set again.

Penalty situations (in which latency is experienced in the system) are avoided as a result of reaffinitizing the klock and pinned memory pages from the second server to the first server using the techniques described herein. This way, most, if not all of the pinned/critical/klock/direct memory access (DMA) pages are present in "home memory clusters". In some approaches, in response to a determination that there is a need of reducing the memory such as performing a disaster recovery (DR) operation of memory, memory is preferably not taken out memory from the home memory cluster of the first server. These benefits are enabled as a result of the techniques described herein providing first-hand information about the LMB that have low profile data so that dynamic reconfiguration is readily performed. Use cases described below provide several examples in which operating systems would experience latencies without utilizing the techniques described herein.

In a first use case, an operating system may offer user devices a memory expansion technology where the allocated logical memory is compressed so that more data can be packed in the given allocated logical memory of the LPAR. This is implemented via typically compressed and uncompressed memory pools. Based on the page usage statistics, pages may move back and forth between compressed and uncompressed memory pools. These compressed and uncompressed memory pools are only perspective of the LPAR and the hypervisor has no idea on the details of these pools. Furthermore, memory content in a compressed pool is cold with respect to an uncompressed pool. As a result of implementing the techniques described herein, e.g., see method 300, the hypervisor is caused to generate information that is provided to an operating system to mitigate the issues of the use case described above.

In a second use case, an operating system may offer a pinned memory concept where the operating system ensures that the pinned range of memory is not pageable. In a pageable kernel environment, the data needs to be accessed in the interrupt context which is more favorable than the pager interrupt. It is better to allocate pinned memory from local memory pool rather than the incepted pool to minimize the time spent in the interrupt disabled environment. As a result of implementing the techniques described herein, e.g., see method 300, the hypervisor is caused to generate information that is provided to an operating system to mitigate the deficiencies of the use case described above.

In a third use case, a system may include two servers, e.g., server A and server B. Server A may borrow memory (X1) from server B. For a duration of this borrowing, server A has its own memory (X2), and server A's hypervisor may be caused to provide this locality information to LPARs running in Server A. This way, an operating system running in the LPAR in server A is able to classify and use the memory resources efficiently in various contexts described herein.

Similar to the second use case, in events in which critical pages such as klock pages and pages that are mapped for a DMA subsystem are allocated from a borrowed remote memory pool, performance of the operating system and drivers is substantially degraded. As a result of implementing the techniques described herein, e.g., see method 300, the hypervisor is caused to generate information that is provided to an operating system to mitigate the deficiencies of the use case described above.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

obtaining information generated by a hypervisor, the generated information detailing a classification process, wherein the classification process includes:

classifying physical memory blocks as residing on a first server or a second server, and associating the physical memory blocks with logical memory blocks of logical partitions of the first server and logical partitions of the second server;

providing the generated information to an operating system used to manage the logical partitions of the first server and the logical partitions of the second server;

causing the operating system to use the information to classify memory pools to a home memory cluster of the first server or to a remote memory cluster of the second server;

causing memory pages to be dynamically stored within allocations of the memory pools; and applying a threshold value to the dynamic storage of the memory pages within the allocations of memory pools;

wherein:

the threshold value is based on a condition of memory resources associated with the home memory cluster; and applying the threshold value comprises:

in response to a determination that the threshold value is exceeded, setting a predetermined flag and causing the operating system to adjust placement of at least a portion of the memory pages among the memory pools based on the threshold value, including causing at least a portion of the memory pages to be stored in the remote memory cluster instead of the home memory cluster.

2. The method of claim 1, wherein a first portion of the memory pools are created for the logical partitions of the first server and a second portion of the memory pools are created for the logical partitions of the second server.

3. The method of claim 1, wherein the causing the operating system to use the information to classify the memory pools to the home memory cluster of the first server or to the remote memory cluster of the second server comprises: classifying a first portion of the memory pools to the home memory cluster of the first server, wherein the first portion of the memory pools does not include compressed memory pools, and classifying a second portion of the memory pools to the remote memory cluster of the second server, wherein the second portion of the memory pools include compressed memory pools.

4. The method of claim 1, wherein:

causing memory pages to be dynamically stored within allocations of the memory pools is based on predetermined usage statistics, a first of the predetermined usage statistics includes an age of the memory pages, and causing memory pages to be dynamically stored within the allocations of the memory pools based on the first predetermined usage statistic comprises:

causing new memory pages to be stored to a memory pool classified to a home memory cluster of the first server and not to be stored to a remote memory cluster of the second server.

5. The method of claim 1, wherein applying the threshold value further comprises:

in response to a determination that the threshold value is not exceeded, causing the memory pages to be dynamically stored within the allocations of the memory pools classified to the home memory cluster.

6. The method of claim 1, further comprising:

in response to a determination that the threshold value is no longer exceeded, unsetting the predetermined flag; and in response to the predetermined flag being unset, performing a predetermined reaffinitization process.

7. The method of claim 6, wherein the predetermined reaffinitization process comprises:

scanning for memory pages stored, as a result of the predetermined flag being set, within the allocations of the memory pools classified to the remote memory cluster of the second server, and causing the memory pages identified by the scanning to be stored within the allocations of the memory pools classified to the home memory cluster of the first server.

8. The method of claim 5, wherein all pinned memory pages and kernel memory pages are only stored within allocations of the memory pools classified to the home memory cluster of the first server except for periods in which the predetermined flag is set.

9. A computer program product comprising:

one or more computer-readable storage media; and program instructions stored on the one or more computer-readable storage media to cause a processor set to perform operations comprising:

obtaining information generated by a hypervisor, the generated information detailing a classification process, wherein the classification process includes:

classifying physical memory blocks as residing on a first server or a second server, and associating the physical memory blocks with logical memory blocks of logical partitions of the first server and logical partitions of the second server;

providing the generated information to an operating system used to manage the logical partitions of the first server and the logical partitions of the second server;

causing the operating system to use the information to classify memory pools to a home memory cluster of the first server or to a remote memory cluster of the second server;

causing memory pages to be dynamically stored within allocations of the memory pools; and applying a threshold value to the dynamic storage of the memory pages within the allocations of memory pools;

wherein:

the threshold value is based on a condition of memory resources associated with the home memory cluster; and applying the threshold value comprises:

in response to a determination that the threshold value is exceeded, setting a predetermined flag and causing the operating system to adjust placement of at least a portion of the memory pages among the memory pools based on the threshold value, including causing at least a portion of the memory pages to be stored in the remote memory cluster instead of the home memory cluster.

10. The computer program product of claim 9, wherein a first portion of the memory pools are created for the logical partitions of the first server and a second portion of the memory pools are created for the logical partitions of the second server.

11. The computer program product of claim 9, wherein the causing the operating system to use the information to classify the memory pools to the home memory cluster of the first server or to the remote memory cluster of the second server comprises: classifying a first portion of the memory pools to the home memory cluster of the first server, wherein the first portion of the memory pools does not include compressed memory pools, and classifying a second portion of the memory pools to the remote memory cluster of the second server, wherein the second portion of the memory pools include compressed memory pools.

12. The computer program product of claim 9, wherein:
causing memory pages to be dynamically stored within allocations of the memory pools is based on predetermined usage statistics,
a first of the predetermined usage statistics includes an age of the memory pages, and
causing memory pages to be dynamically stored within the allocations of the memory pools based on the first predetermined usage statistic comprises:
causing new memory pages to be stored to a memory pool classified to a home memory cluster of the first server and not to be stored to a remote memory cluster of the second server.

13. The computer program product of claim 9,
wherein applying the threshold value further comprises:
in response to a determination that the threshold value is not exceeded, causing the memory pages to be dynamically stored within the allocations of the memory pools classified to the home memory cluster.

14. The computer program product of claim 9, wherein the operations further comprise:
in response to a determination that the threshold value is no longer exceeded, unsetting the predetermined flag; and
in response to the predetermined flag being unset, performing a predetermined reaffinitization process.

15. The computer program product of claim 14, wherein the predetermined reaffinitization process comprises:
scanning for memory pages stored, as a result of the predetermined flag being set, within the allocations of the memory pools classified to the remote memory cluster of the second server, and
causing the memory pages identified by the scanning to be stored within the allocations of the memory pools classified to the home memory cluster of the first server.

16. The computer program product of claim 13, wherein all pinned memory pages and kernel memory pages are only stored within allocations of the memory pools classified to the home memory cluster of the first server except for periods in which the predetermined flag is set.

17. A computer system comprising:
a processor set;
one or more computer-readable storage media; and
program instructions stored on the one or more storage media to cause the processor set to perform operations comprising:
obtaining information generated by a hypervisor, the generated information detailing a classification process, wherein the classification process includes:
classifying physical memory blocks as residing on a first server or a second server, and
associating the physical memory blocks with logical memory blocks of logical partitions of the first server and logical partitions of the second server;
providing the generated information to an operating system used to manage the logical partitions of the first server and the logical partitions of the second server;
causing the operating system to use the information to classify memory pools to a home memory cluster of the first server or to a remote memory cluster of the second server;
causing memory pages to be dynamically stored within allocations of the memory pools based on predetermined usage statistics;
applying a first threshold value to the dynamic storage of the memory pages within the allocations of memory pools,
wherein the first threshold value is based on the allocations of the memory pools classified to the home memory cluster,
wherein the causing the memory pages to be dynamically stored within the allocations of the memory pools based on predetermined usage statistics comprises:
in response to a determination that the first threshold value is exceeded, setting a predetermined flag and not causing the memory pages to be dynamically stored within the allocations of the memory pools classified to the home memory cluster; and
in response to a determination that the first threshold value is not exceeded, causing the memory pages to be dynamically stored within the allocations of the memory pools classified to the home memory cluster.

18. The computer system of claim 17, wherein a first portion of the memory pools are created for the logical partitions of the first server and a second portion of the memory pools are created for the logical partitions of the second server.

19. The computer system of claim 17, wherein the causing the operating system to use the information to classify the memory pools to the home memory cluster of the first server or to the remote memory cluster of the second server comprises: classifying a first portion of the memory pools to the home memory cluster of the first server, wherein the first portion of the memory pools does not include compressed memory pools, and classifying a second portion of the memory pools to the remote memory cluster of the second server, wherein the second portion of the memory pools include compressed memory pools.

20. The computer system of claim 17, wherein a first of the predetermined usage statistics includes an age of the memory pages, wherein the causing memory pages to be dynamically stored within the allocations of the memory pools based on the first predetermined usage statistic comprises: causing new memory pages to be stored to a memory pool classified to a home memory cluster of the first server and not to be stored to a remote memory cluster of the second server.

* * * * *